United States Patent
Wu et al.

(10) Patent No.: US 7,668,077 B2
(45) Date of Patent: Feb. 23, 2010

(54) TIME-SPACE BLOCK PRECODING METHOD IN MULTI-USER DOWN LINK

(75) Inventors: Qiang Wu, Beijing (CN); Jifeng Li, Kanagawa (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 11/909,385

(22) PCT Filed: Mar. 23, 2006

(86) PCT No.: PCT/JP2006/305870
§ 371 (c)(1),
(2), (4) Date: Sep. 21, 2007

(87) PCT Pub. No.: WO2006/101180
PCT Pub. Date: Sep. 28, 2006

(65) Prior Publication Data
US 2009/0052354 A1    Feb. 26, 2009

(30) Foreign Application Priority Data
Mar. 24, 2005   (CN)   ............... 2005 1 0055977

(51) Int. Cl.
*H04J 11/00* (2006.01)
*H04W 4/00* (2009.01)
*H04B 7/02* (2006.01)
*H04L 27/00* (2006.01)

(52) U.S. Cl. ............... 370/208; 370/337; 375/267; 375/299

(58) Field of Classification Search ............ 370/203, 370/208; 375/267, 299
See application file for complete search history.

(56) References Cited

U.S. PATENT DOCUMENTS

| | | | |
|---|---|---|---|
| 6,804,307 B1 | 10/2004 | Popovic | |
| 6,816,557 B2 | 11/2004 | Kuchi et al. | |
| 7,136,427 B2 * | 11/2006 | Niida et al. | 375/299 |
| 7,197,084 B2 * | 3/2007 | Ketchum et al. | 375/296 |
| 7,242,724 B2 * | 7/2007 | Alexiou et al. | 375/267 |
| 7,522,673 B2 * | 4/2009 | Giannakis et al. | 375/267 |
| 2001/0017903 A1 | 8/2001 | Naguib et al. | |
| 2003/0161412 A1 | 8/2003 | Niida et al. | |
| 2005/0020237 A1 | 1/2005 | Alexiou et al. | |
| 2005/0031062 A1 * | 2/2005 | Shim et al. | 375/347 |
| 2006/0234729 A1 | 10/2006 | Murakami et al. | |

* cited by examiner

*Primary Examiner*—Nittaya Juntima
(74) *Attorney, Agent, or Firm*—Dickinson Wright PLLC (57) ABSTRACT

There is provided a down link multi-user time-space code precoding method including: a step (S401) where a base station acquires channel information on a plurality of user terminals and converts it into a channel matrix; a step (S402) for obtaining a such a conversion matrix that a matrix obtained by multiplying the channel matrix and the conversion matrix is a block diagonal orthogonal matrix; a step (S403) for obtaining a standardization factor of each user terminal by squaring the elements on the diagonal line of the block diagonal orthogonal matrix; a step (S404) for standardizing a transmitted symbol of each user by using the standardization factor; and a step (S405) for multiplying the conjugate transposed matrix and the conversion matrix of the block diagonal orthogonal matrix into standardized symbols successively from the left so as to obtain symbols after the processing and transmitting the processed symbols by the time-space code rule. This method improves the downlink performance and effectively improves the radio system capacity.

7 Claims, 6 Drawing Sheets

TIME-SPACE BLOCK PRECODING METHOD IN MULTI-USER DOWN LINK

TECHNICAL FIELD

The present invention relates to space time block pre-coding for multi-users of STBC (Space Time Block Coding) in multi-user MIMO communication.

BACKGROUND ART

STC (Space Time Coding) is a new coding and signal processing technique in mobile communication fields, which is recently researched. STC is a technique of performing transmission and reception between a transmitting side and a receiving side at the same time using a plurality of antennas, introducing time domain correlation and space domain correlation between transmission signals of different antennas, using two-dimensional information for the time domain and the space domain together, and performing diversity reception on the receiving side. Compared to systems that do not use space time coding, in space time coding, a higher coding gain can be obtained without changing a bandwidth. When the configuration of the receiver is simple, by providing an apparatus with a configuration for space time coding, it is possible to effectively increase capacity of a wireless system.

Figure 1:
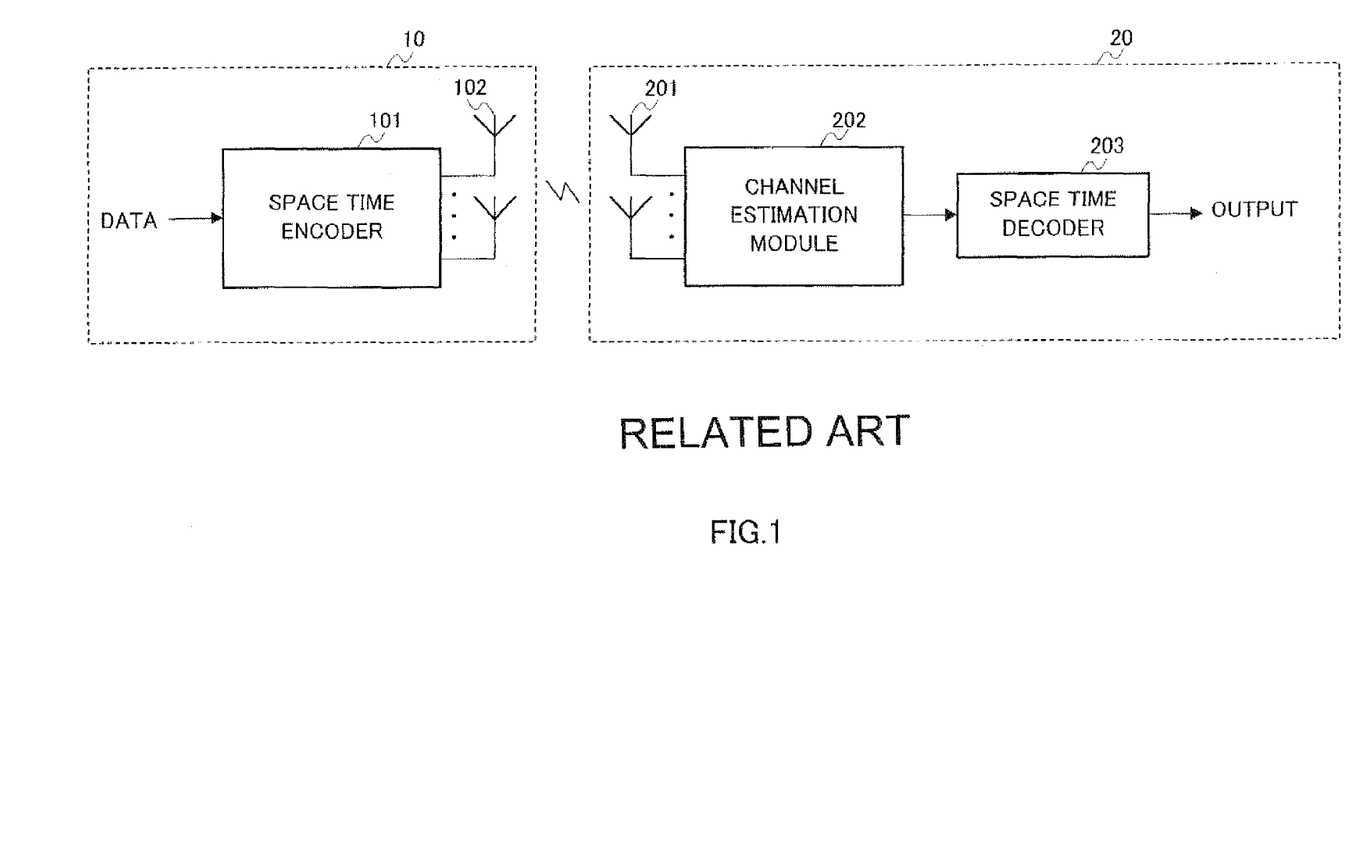
FIG. 1 shows a configuration of a space time coding system.

FIG. 1 shows a commonly adopted space time coding system configuration. At base station 10, space time encoder 101 processes transmission data. The data processed by space time encoder 101 is transmitted by transmitting antenna 102. Receiving antenna 201 then receives the data at mobile terminal 20. Channel estimation module 202 then estimates channel matrix H based on the received data. Space time decoder 203 decodes space time codes based on channel matrix H estimated by channel estimation module 202 and outputs the estimated data.

<Alamouti Space Time Block Code>

Figure 2:
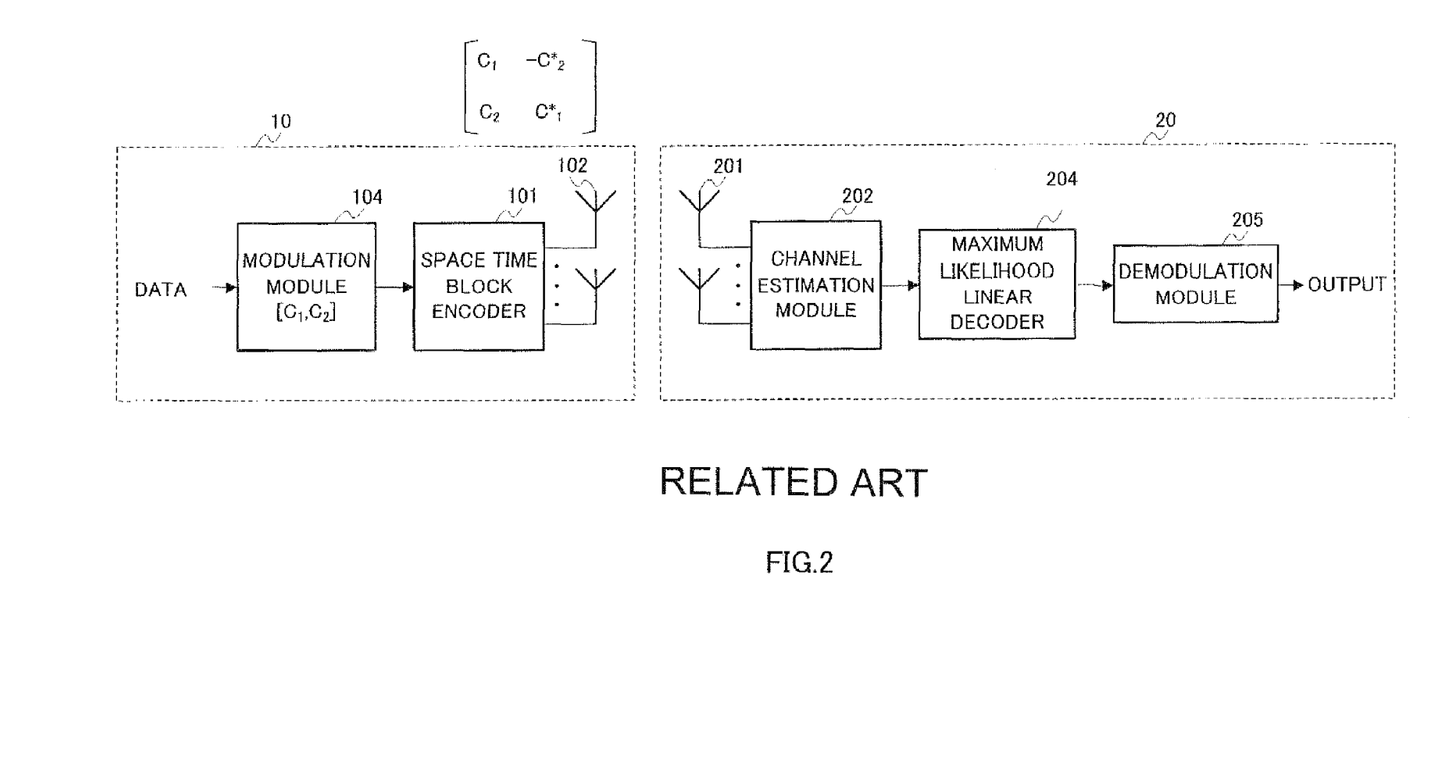
FIG. 2 shows a configuration of an Alamouti space time block coding system.

Alamouti proposes a transmission method of using two transmitting antennas taking into consideration lowering of decoding complexity. FIG. 2 is a block diagram of a space time block code principle. First, at base station 10, data is mapped to a constellation by modulation module 104, and transmission symbols are obtained. The transmission symbols are then separated into one group of two symbols [$c_1$, $c_2$] by space time block encoder 101. After space time block encoding, two antennas transmit two symbols [$c_1$, $c_2$] at the same time within two symbol periods. In period 1, antenna 1 transmits $c_1$ and antenna 2 transmits $c_2$. In period 2, antenna 1 transmits $-c_2^*$ and antenna 2 transmits $c_1^*$ (where superscript "*" indicates a plurality of conjugates). Symbols of all columns of the coding matrix are transmitted at the same time from different antennas. Constellation point symbols transmitted from one antenna and symbols transmitted from another arbitrary antenna are orthogonal. This is shown specifically in table 1.

TABLE 1

|  | PERIOD 1 | PERIOD 2 |
| --- | --- | --- |
| ANTENNA 1 | $c_1$ | $-c_2^*$ |
| ANTENNA 2 | $c_2$ | $c_1^*$ |

At mobile terminal 20, reliable detection is possible using just one antenna (it is assumed that the channel for these two characters does not change within time). In equation 1, T is a symbol period.

[1]
$$h_i(nT)=h_i((n+1)T), i=1,2 \quad \text{(Equation 1)}$$

When received signals between adjacent characters are $r_1$ and $r_2$, the received signals can be expressed using the following equation 2.

[2a]
$$r_1=h_1c_1+h_2c_2+\eta_1 \quad \text{(Equation 2a)}$$

[2b]
$$r_2=-h_1c_2^*+h_2c_1^*+\eta_2 \quad \text{(Equation 2b)}$$

In equation 2, when $\eta_1$ and $\eta_2$ indicate AWGN (Added White Gaussian Noise), received signal $r=[r_1 r_2^*]^T$ (where T indicates transposition), encoded symbol vector $c=[c_1 c_2^*]^T$ and noise vector $\eta=[\eta_1 \eta_2^*]^T$, and the following equation 3 can be substituted for equation 2.

[3]
$$r=Hc+\eta \quad \text{(Equation 3)}$$

In equation 3, channel matrix H is defined as shown in the following equation 4.

[4]
$$H = \begin{bmatrix} h_1 & h_2 \\ h_2^* & -h_1^* \end{bmatrix} \quad \text{(Equation 4)}$$

Here, H is an orthogonal matrix, and the following equation 5 is satisfied.

[5]
$$H^H H = HH^H = pI_2 \quad \text{(Equation 5)}$$

In equation 5, $p=|h_1|^2+|h_2|^2$, and $I_N$ indicates a unit matrix where rows and columns are both N (superscript "H" indicates conjugate transposition).

Referring to equation 3, when C defines sets of all possible symbol pairs ($c_1$, $c_2$), an optimum maximum likelihood decoder is as shown in the following equation 6.

[6]
$$\hat{c} = \underset{\hat{c} \in C}{\operatorname{argmin}} \|r - H\hat{c}\|^2 \quad \text{(Equation 6)}$$

H is an orthogonal matrix, and therefore it is possible to further simplify the decoding rule of equation 6. When $\tilde{r}$ and $\tilde{\eta}$ are defined as $\tilde{r}=H^H r$ and $\tilde{\eta}=H^H \eta$, when both sides of equation 3 are multiplied from the left with $H^H$, the following equation 7 is obtained.

[7]
$$\tilde{r}=pc+\tilde{\eta} \quad \text{(Equation 7)}$$

At this time, the decoding rule of equation 6 becomes as in the following equation 8.

[8]
$$\hat{c} = \underset{\hat{c} \in C}{\operatorname{argmin}} \|\tilde{r} - p\hat{c}\|^2 \quad \text{(Equation 8)}$$

As a result, a two-dimensional maximum likelihood decision problem is changed to a one-dimensional decision problem.

In the processing steps on the receiving side, receiving antenna 201 receives a signal. Channel estimation module 202 then estimates channels $h_1$ and $h_2$. Maximum likelihood linear decoder 204 obtains received signals $r_1$ and $r_2$ for two adjacent times. Demodulation module 205 then transforms the two time signals to $r=[r_1\ r_2^*]^T$, multiplies r with $H^H$ from the left side, obtains $\hat{c}$ from equation 8, maps this $\hat{c}$ to the bitstream and outputs the result.

The above method can also be applied to the case where M antennas are used. In this case, a reception vector for the mth receiving antenna is shown in the following equation 9.

[9]

$$r_m = H_m c + \eta_m \quad \text{(Equation 9)}$$

When the sum of m is obtained by multiplying $H_m^H$ from the left side of equation 9, and $R_M$ is defined as $R_M = \Sigma H_m r_m$ (m=1, 2, ... M), maximum likelihood decision is simplified, and the following equation 10 is obtained.

[10]

$$\hat{c} = \underset{\hat{c} \in C}{\operatorname{argmin}} \| R_M - \tilde{p}\hat{c} \|^2 \quad \text{(Equation 10)}$$

In equation 10, $\tilde{p} = \Sigma P_m$ (m=1, 2, ... M), $p_m = |h(m)_1|^2 + |h(m)_2|^2$.

<DSTTD Method>

In the Alamouti method, the number of transmitting antennas is two, and therefore the number of users is limited to one. In 3GPP protocol, with DSTTD (Double Space Transmitting Diversity), the transmission side is capable of transmitting a plurality of user signals at the same time based on the Alamouti method using two antennas on the terminal side. The base station side is capable of separating signals of a plurality of users using a method combining an interference canceling method and a maximum likelihood method. The number of users is K, and therefore, if receiving antennas of the base station are M≧K, the base station can eliminate interference. For example, when the number of users is two (the number of transmitting antennas for all the users is two), two antennas are sufficient for the base station. As a result, a system can be configured where the number of transmitting antennas is four and the number of receiving antennas is two.

DISCLOSURE OF THE INVENTION

Problems to be Solved by the Invention

However, when there is a plurality of user terminals, with the DSTTD method, each terminal only knows a channel of the terminal in downlink and does not know the signals of other users. The DSTTD method therefore cannot be applied to a downlink, and can only be applied to an uplink. In downlink, the DSTTD method can only be applied to the case of a single user.

It is therefore an object of the present invention to provide a space time block code multi-user pre-coding method capable of improving downlink performance using space time code characteristics in multi-user MIMO downlink communication.

Means for Solving the Problem

An aspect of the present invention has: a first step of acquiring channel information for a plurality of user terminals at a base station; a second step of transforming the channel information for the plurality of user terminals into a channel matrix; a third step of obtaining a transform matrix where a result of multiplication with the channel matrix is a block diagonal orthogonal matrix, based on the channel matrix; a fourth step of obtaining standardization factors for each user terminal by obtaining a square of elements that are diagonals of the block diagonal orthogonal matrix; a fifth step of carrying out standardizing processing on symbols of each user to be transmitted using the standardization factors; a sixth step of multiplying a conjugate transposed matrix of the block diagonal orthogonal matrix and the transform matrix with the standardized symbols in order from the left and obtaining processed symbols; and a seventh step of transmitting the processed symbols based on space time block coding rules.

It is a further object of the present invention to provide a method for demodulating symbols encoded using the above-described method.

Advantageous Effect of the Invention

According to the above configuration, it is possible to increase the amount of system throughput by performing multi-user downlink transmission using a space time block pre-coding method.

BEST MODE FOR CARRYING OUT THE INVENTION

Figure 3:
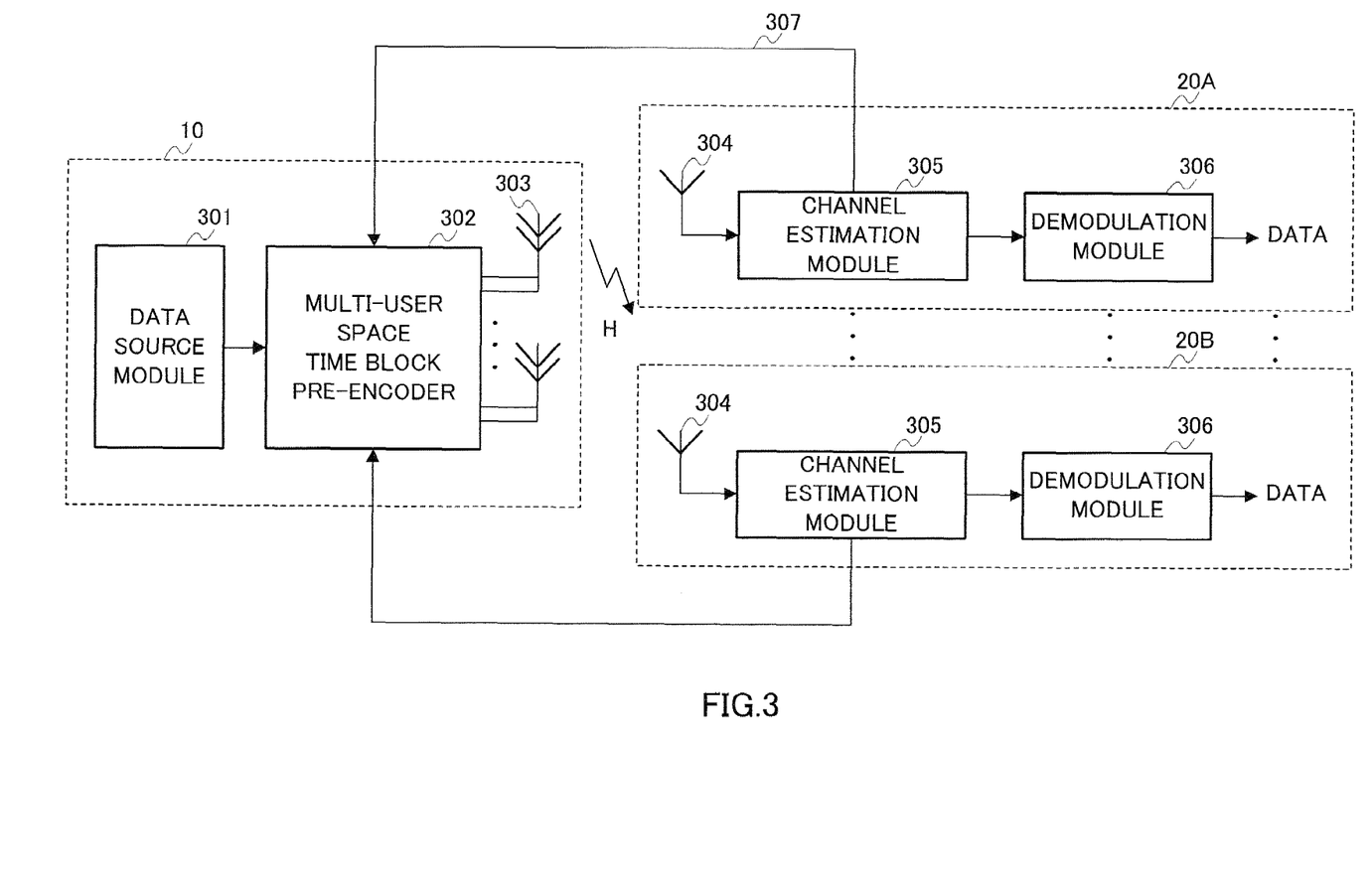
FIG. 3 is a configuration diagram of the present invention.

FIG. 3 is a configuration diagram of the present invention.

First, receiving antennas 304 of mobile terminals 20A and 20B receive data. Channel information is obtained by channel estimation module 305. The obtained channel information is fed back to base station 10 via feedback channel 307.

At the base station side, multi-user space time block pre-encoder 302 acquires data for each user from data source module 301 and performs space time block pre-coding. The pre-coded data is transmitted from receiving antennas 303. Signals are received by receiving antennas 304 on the side of mobile terminals 20A and 20B of the users. The received signals are transmitted to demodulation module 306 via channel estimation module 305. Demodulation module 306 directly demodulates and outputs data of demodulation module 306.

Figure 4:
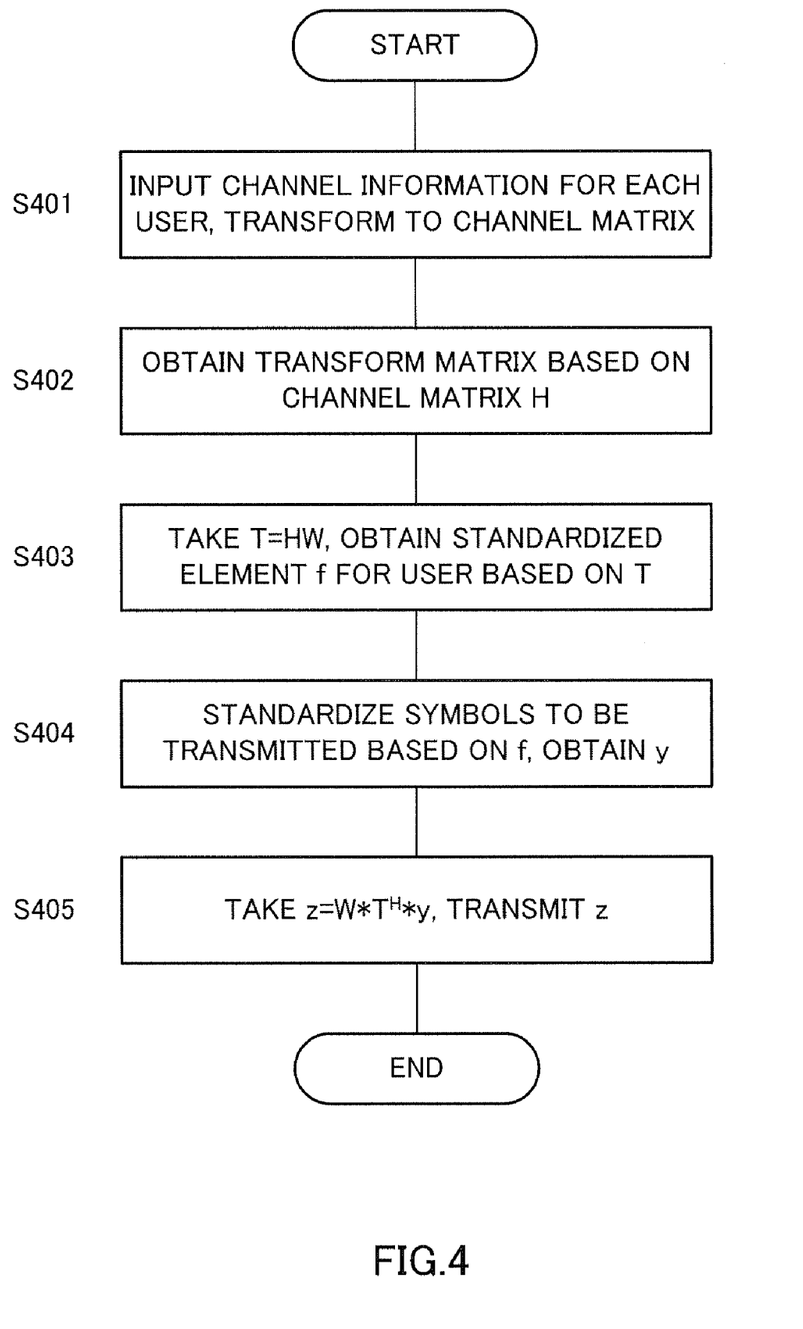
FIG. 4 is a flowchart for multi-user space time block pre-coding (at a base station side)

FIG. 4 is a flowchart for multi-user space time block pre-encoder 302 of the base station side. The flow will be described below using a specific example.

In this example, it is assumed that the number of users K=2, each user has one antenna, the number of base station antennas is four, and two base station antennas are allocated for each user. For example, first and second base station antennas are allocated to user 1, and third and fourth antennas are allocated to user 2.

In step S401, multi-user space time block pre-encoder 302 acquires channels of each user, and the acquired channels of each user are combined with channel matrix H. This point will be described in detail below.

For user 1, $h_{11}$ is a channel between the first antenna of the base station and the receiving antenna of user 1. $h_{21}$ is a channel between the second antenna of the base station and the receiving antenna of user 1. $g_{11}$ is a channel between the third antenna of the base station and the receiving antenna of user 1. $g_{21}$ is a channel between the fourth antenna of the base station and the receiving antenna of user 1. Similarly, $h_{12}$, $h_{22}$, $g_{12}$ and $g_{22}$ are channels between the transmitting antennas of the base station and the receiving antennas of user 2, respectively. The eight obtained channel values change as shown in the following equations 11 and 12. In equations 11 and 12, $H_1$, $H_2$, $G_1$ and $G_2$ are all orthogonal matrices.

[11a]

$$H_1 = \begin{bmatrix} h_{11} & h_{21} \\ h_{21}^* & -h_{11}^* \end{bmatrix}, G_1 = \begin{bmatrix} g_{11} & g_{21} \\ g_{21}^* & -g_{11}^* \end{bmatrix} \quad \text{(Equation 11a)}$$

[11b]

$$H_2 = \begin{bmatrix} h_{12} & h_{22} \\ h_{22}^* & -h_{12}^* \end{bmatrix}, G_2 = \begin{bmatrix} g_{12} & g_{22} \\ g_{22}^* & -g_{12}^* \end{bmatrix} \quad \text{(Equation 11b)}$$

[12]

$$H = \begin{bmatrix} H_1 & G_1 \\ H_2 & G_2 \end{bmatrix} \quad \text{(Equation 12)}$$

In step S402, multi-user space time block pre-encoder 302 obtains transform matrix W based on channel matrix H. Transform matrix W can be obtained from the following equation 13.

[13]

$$W = \begin{bmatrix} I_2 & -H_1^{-1} G_1 \\ -G_2^{-1} H_2 & I_2 \end{bmatrix} \quad \text{(Equation 13)}$$

In step S403, multi-user space time block pre-encoder 302 obtains standardization factor f for each user taking T=HW and based on T. T can be obtained from the following equation 14.

[14]

$$T = HW \quad \text{(Equation 14)}$$
$$= \begin{bmatrix} T_1 & 0 \\ 0 & T_2 \end{bmatrix}$$
$$= \begin{bmatrix} H_1 - G_1 G_2^{-1} H_2 & 0 \\ 0 & G_2 - H_2 H_1^{-1} G_1 \end{bmatrix}$$

$T_1 = H_1 - G_1 G_2^{-1} H_2$ after transformation is an orthogonal matrix (2×2), and $T_2 = G_2 - H_2 H_1^{-1} G_1$ is an orthogonal matrix (2×2). Therefore, T is also an orthogonal matrix (4×4). Standardization factor f can then be obtained from the following equation 15.

[15]

$$f = \text{diag}(TT^H) \quad \text{(Equation 15)}$$

diag of equation 15 means obtaining a diagonal element. For example, f=(1.2492, 1.2492, 2.0403, 2.0402). In reality, $f_1 = f_2$ is the square of the row reference values of the first row (or second row) of $T_1$. Further, $f_3 = f_4$ is the square of the row reference values of the first row (or second row) of $T_2$.

In step S404, multi-user space time block pre-encoder 302 standardizes transmitted symbols based on f so as to obtain y. A method of calculating y will be described in detail below.

Two transmission symbols are allocated to all users. There are four transmission symbols altogether. Here, x is defined as $x=(x_1, x_2, x_3, x_4)^T$, $x_1$ and $x_2$ are allocated to user 1, and $x_3$ and $x_4$ are allocated to user 2. The standardization rule is indicated by the following equation 16. In equation 16, $y=(y_1, y_2, y_3, y_4)^T$ is a column vector.

[16]

$$y_i = x_i / f_i \quad i=1,2,3,4 \quad \text{(Equation 16)}$$

In step S405, multi-user space time block pre-encoder 302 transmits z taking $z = W \times T^H \times y$. Here, z is obtained by transforming y as shown in the following equation 17.

[17]

$$z = W \times T^H \times y \quad \text{(Equation 17)}$$

In equation 17, $z=(z_1, z_2, z_3, z_4)^T$, and a transmission method using the Alamouti space time block code is shown in table 2.

TABLE 2

| BASE STATION ANTENNA | SYMBOL PERIOD 1 TRANSMISSION | SYMBOL PERIOD 2 TRANSMISSION |
|---|---|---|
| ANTENNA 1 (USER 1) | $z_1$ | $-z_2^*$ |
| ANTENNA 2 (USER 1) | $z_2$ | $z_1^*$ |
| ANTENNA 3 (USER 2) | $z_3$ | $-z_4^*$ |
| ANTENNA 4 (USER 2) | $z_4$ | $z_3^*$ |

Figure 5:
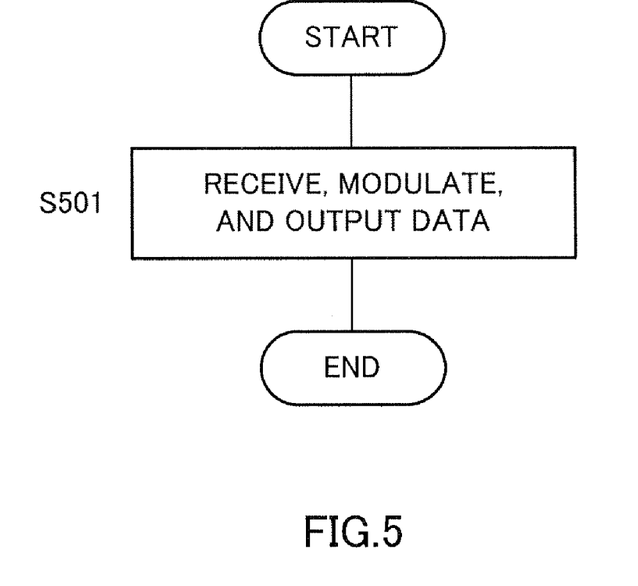
FIG. 5 is a reception flowchart of multi-user space time block pre-coding (at a receiving side terminal)

FIG. 5 is a flowchart for multi-user space time block pre-coding reception. A specific description is given in the following based on the flow.

In step S501, demodulation module 306 of FIG. 3 demodulates and outputs received data. Demodulation module 306 directly demodulates data received in symbol period 1 for signals of all users. Further, demodulation module 306 obtains conjugates for data received in symbol period 2 and performs demodulation.

The overall process will be described below using an example (refer to the embodiment for the assumed conditions). It is assumed that the modulation scheme is 16QAM and the channels are as shown in the following.

$h_{11}$=0.5334−0.3459i $h_{21}$=−0.0478+0.6270i
$g_{11}$=0.1472−0.7205i $g_{21}$=0.3572−0.1999i
$h_{12}$=0.0296+0.4290i $h_{22}$=−0.4162−0.7969i
$g_{12}$=−0.6681+0.2856i $g_{22}$=0.8118+0.3450i

T, W and f are obtained using equations 11, 12, 13, 14 and 15. Here, f=(1.2492, 1.2492, 2.0403, 2.0402) The transmission symbols are as shown in the following.

$x=(x_1, x_2, x_3, x_4)$ $x_1$=−0.3162−0.3162i, $x_2$=0.9487−0.3162i,
$x_3$=−0.9487+0.3162i, $x_4$=0.3162−0.3162i $x_1$ and $x_2$ are data for user 1, $x_3$ and $x_4$ are data for user 2. When the values of $x_1$ and $x_2$ are divided by $f_1$, and the values of $x_3$ and $x_4$ are divided by $f_3$, the following results are obtained.

$y_1 = -0.2531 - 0.2531i$ $y_2 = 0.7594 - 0.2531i$
$y_3 = -0.4650 + 0.1550i$ $y_4 = 0.1550 - 0.1550i$ $$y = (y_1, y_2, y_3, y_4)^T$$

When y is transformed, $z = W \times T^H \times Y$.

$$Z = (z_1, z_2, z_3, z_4)^T$$

$z_1 = 0.0538 + 0.2057i$ $z_2 = 0.5658 + 0.5266i$
$z_3 = 1.2980 - 0.3580i$ $z_4 = -0.1157 + 0.5337i$

In symbol period 1, $z_1$ and $z_2$ are transmitted respectively from the two antennas allocated to user 1 by the base station. Further, $z_3$ and $z_4$ are transmitted respectively from the two antennas allocated to user 2 by the base station. In symbol period 2, $-z_2^*$ and $z_1^*$ are transmitted respectively from the two antennas allocated to user 1 by the base station. Further, $-z_4^*$ and $z_3^*$ are transmitted respectively from the two antennas allocated to user 2 by the base station.

When there is no noise at a receiving antenna, the signal received by user 1 in period 1 is $r_{11} = h_{11}z_1 + h_{21}z_2 + g_{11}z_3 + g_{21}z_4 = -0.3162 - 0.3162i = x_1$, and the signal received by user 1 in period 2 is $r_{12} = -h_{11}z_2^* + h_{21}z_1^* - g_{11}z_4^* + g_{21}z_3^* = 0.9487 + 0.3162i = x_2^*$.

Processing for the signal received by user 2 is the same as the received signal for user 1, and user 2 directly demodulates received signal $r_{21}$ in symbol period 1, and carries out demodulation in symbol period 2 after obtaining conjugates for received signal $r_{22}$.

<Expansion when K Users Perform Space Time Coding at the Same Time>

In the above embodiment, the case where K=2 has been described. In the following, the case where K≧2 will be described. The number of users is assumed to be K, and each user has one receiving antenna. The base station side then has 2K antennas, that is, two antennas are used for each user.

The transmission method for all users is the Alamouti scheme, and is shown in table 3. In table 3, $z_1$ and $z_2$ are pre-coded symbols.

TABLE 3

| TRANSMITTING ANTENNA | SYMBOL PERIOD 1 TRANSMISSION | SYMBOL PERIOD 2 TRANSMISSION |
|---|---|---|
| ANTENNA 1 | $z_1$ | $-z_2^*$ |
| ANTENNA 2 | $z_2$ | $z_1^*$ |

First, it is assumed that K=2. Here, it is assumed that $r_{11}$ is a signal received by user 1 in symbol period 1, $r_{12}$ is a signal received by user 1 in symbol period 2, $r_{21}$ is a signal received by user 2 in symbol period 1, and $r_{22}$ is a signal received by user 2 in symbol period 2. Received signal r is defined by the following equation 18.

[18]

$$r_1 = [r_{11}, r_{12}^*]^T, r_2 = [r_{21}, r_{22}^*]^T, r = \begin{bmatrix} r_1 \\ r_2 \end{bmatrix} \quad \text{(Equation 18)}$$

When pre-coded symbols transmitted by user 1 are $c_1$ and $c_2$ and pre-coded symbols $s_1$ and $s_2$ transmitted by user 2 are $s_1$ and $s_2$, received signal r can be obtained using the following equation 19.

[19]

$$r = Hz + n \quad \text{(Equation 19)}$$

where c, s and z are defined as $c = [c1, c2]^T$, $s = [s1, s2]^T$, $$z = \begin{bmatrix} c \\ s \end{bmatrix},$$

respectively.

H of equation 19 can be obtained using equation 12. In equation 19, n is white noise. According to equation 12, $H_1$, $H_2$, $G_1$ and $G_2$ are all orthogonal matrices. When a weight matrix for the data symbols is W, W satisfies the following equation 20. In equation 20, $T_1$ and $T_2$ are orthogonal matrices as shown in equation 4.

[20]

$$T = HW = \begin{bmatrix} T_1 & 0 \\ 0 & T_2 \end{bmatrix} \quad \text{(Equation 20)}$$

When W is as shown in the following equation 21, the following equation 22 is obtained from equation 20.

[21]

$$W = \begin{bmatrix} W_1 & W_2 \\ W_3 & W_4 \end{bmatrix} \quad \text{(Equation 21)}$$

[22a]

$$H_1 W_2 + G_1 W_2 = 0 \quad \text{(Equation 22a)}$$

[22b]

$$H_2 W_1 + G_2 W_3 = 0 \quad \text{(Equation 22b)}$$

[22c]

$$T_1 = H_1 W_1 + G_1 W_3 \quad \text{(Equation 22c)}$$

[22d]

$$T_2 = H_2 W_2 + G_2 W_4 \quad \text{(Equation 22d)}$$

Equality of equation 22 adopts the condition that $T_1$ and $T_2$ are orthogonal matrices. In equation 22, $T_1$, $T_2$, $W_1$, $W_2$, $W_3$ and $W_4$ are unknown, and the solution of equation 22 is not a single solution. In the following, a way of obtaining W will be described.

As shown in equation 4, H is a 2×2 orthogonal matrix having the following properties. 1. If A and B are orthogonal matrices as shown in equation 4, C=A±B is an orthogonal matrix as shown in equation 4. 2. If A and B are orthogonal matrices as shown in equation 4, C=A×B is as the following equation 23.

[23]

$$C = \begin{bmatrix} C_1 & C_2 \\ -C_2^* & C_1^* \end{bmatrix} \quad \text{(Equation 23)}$$

3. If A, B and D are orthogonal matrices as shown in equation 4, E=A×B×D is an orthogonal matrix as shown in equation 4.
4. If A is an orthogonal matrix as shown in equation 4, B=A$^{-1}$ is an orthogonal matrix as shown in equation 4.

In equation 22c, if H$_1$W$_1$ and G$_1$W$_3$ are orthogonal matrices as shown in equation 4, T$_1$ is also the same. If W$_1$=I$_2$ is a unit matrix, H$_1$W$_1$ satisfies equation 4. Similarly, according to equation 22d, when W$_4$=I$_2$, equation 22 becomes four equations, which gives four unknown matrices, and therefore there is a single solution. An equation for obtaining four unknown matrices is shown in the following equation 24.

[24a]
$$W_2 = -H_1^{-1} G_1 \quad \text{(Equation 24a)}$$

[24b]
$$W_3 = -G_2^{-1} H_2 \quad \text{(Equation 24b)}$$

[24c]
$$T_1 = H_1 - G_1 G_2^{-1} H_2 \quad \text{(Equation 24c)}$$

[24d]
$$T_2 = G_2 - H_2 H_1^{-1} G_1 \quad \text{(Equation 24d)}$$

Figure 6:
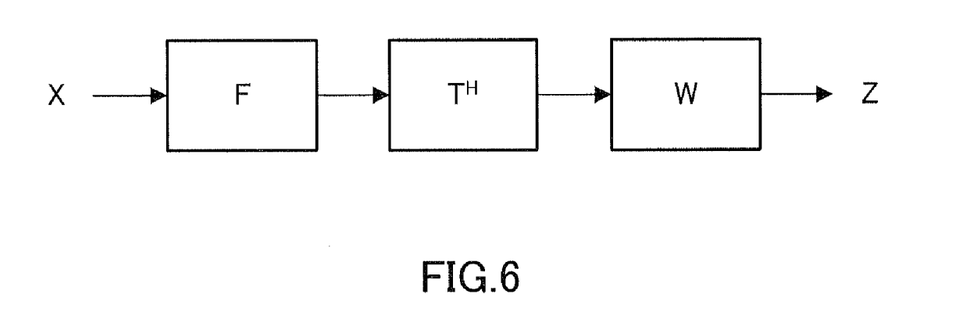
FIG. 6 shows a multi-user space time block pre-coding matrix.

According to properties 1 and 4, T$_1$T$_2$ is an orthogonal matrix as shown in equation 4, and TT$^H$ is a diagonal matrix. The jth diagonal element enhances the amplitude of j data, and step S404 is therefore necessary. As a result, symbols reaching the receiving side are the original transmission symbols. When F is defined as shown in the following equation 25, the pre-coding matrix becomes as shown in FIG. 6. Further, when data symbols are X, pre-coded symbols Z are shown in the following equation 26.

[25]
$$F = (TT^H)^{-1} \quad \text{(Equation 25)}$$

[26]
$$Z = WT^H FX \quad \text{(Equation 26)}$$

Looking from a different angle, when Y=FX, Q=T$^H$×Y, and Z=WQ, the above-described pre-coding can be expressed as follows.

1. Y=FX

F is a diagonal matrix and a matrix for standardizing processing. As a result, symbols reaching the transmitting side are original information symbols. W eliminates another interference of STTD. At the same time, by calculating HW=T (where T is a block diagonal matrix as shown in equation 14), T$_1$ and T$_2$ can be obtained, and therefore it is possible to maintain a STTD configuration in T$_1$ and T$_2$. The diagonal matrix for TT$^H$ is obtained after passing through the channel, and therefore TH is multiplied with FX from the left. As a result, pre-coded symbols reach the receiving side, and, on the receiving side, it is possible to restore symbols without being influenced by interference.

2. Q=T$^H$×Y

Q is obtained in order to obtain pre-modulation effects for space time codes based on channel characteristics. The received signal is r=HW, Q=TT$^H$×Y, and TT$^H$ is a diagonal matrix. Each element of r has a difference of a multiple of 1 (elements corresponding to TT$^H$ diagonals) with respect to each element of Y.

3. Z=WQ

Received signals r=HW, Q=TQ. T is a block diagonal matrix as shown in equation 14. Another interference of STTD is eliminated by W.

When the number of users K>2, for example, K=3, the following equations 27, 28 and 29 can be obtained using similar methods.

[27]
$$H = \begin{bmatrix} H_1 & G_1 & L_1 \\ H_2 & G_2 & L_2 \\ H_3 & G_3 & L_3 \end{bmatrix} \quad \text{(Equation 27)}$$

[28]
$$W = \begin{bmatrix} I_2 & W_2 & W_3 \\ W_4 & I_2 & W_6 \\ W_7 & W_8 & I_2 \end{bmatrix} \quad \text{(Equation 28)}$$

[29]
$$T = HW = \begin{bmatrix} T_1 & 0 & 0 \\ 0 & T_2 & 0 \\ 0 & 0 & T_3 \end{bmatrix} \quad \text{(Equation 29)}$$

When T$_i$(2×2) is an orthogonal matrix as shown in equation 4, there are six unknowns for W$_i$ and six equations, so that W$_i$ is solved. Further, when T$_i$ is obtained, all T$_i$ can be transformed to the forms of T$_i$=A+B (where A and B are orthogonal matrices). According to property (1), T$_i$ is also an orthogonal matrix. If, in a system where the number of users is K, W is such that block diagonal elements are unit matrices as shown in equation 28, W satisfying the requirements can be obtained. Unknown W and equations are both K(K−1) for the K users. When W is obtained, according to equation 29, T can be obtained. The matrices of FIG. 6 can be applied to arbitrary values of K (equation 26).

Figure 7:
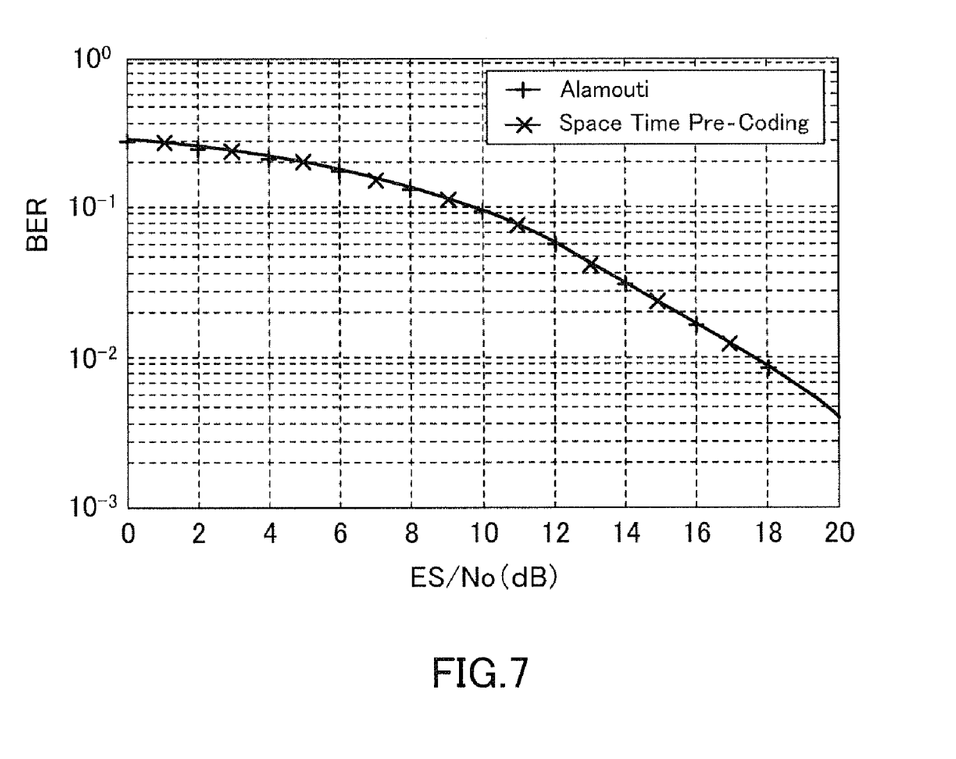
FIG. 7 shows a comparison between Alamouti space time block coding and space time block pre-coding of the present invention.

FIG. 7 is a diagram for comparing Alamouti space time coding and space time pre-coding of the present invention. In simulations, the number of users of the present invention is two. In FIG. 7, Es is the average power of transmission symbols, and N$_0$ is noise power. As is clear from FIG. 7, the code error rate and performance of the present invention are the same as the performance of Alamouti space time coding, and the amount of throughput doubles. As a result, by using a space time pre-coding method, the present invention may be applied to multi-user transmission in downlink, and it is possible to increase the amount of system throughput and improve performance by utilizing space time code characteristics.

The invention claimed is:

1. A downlink multi-user space time block code pre-coding method, comprising:
    a first step of acquiring channel information for a plurality of user terminals at a base station;
    a second step of transforming the channel information for the plurality of user terminals into a channel matrix;
    a third step of obtaining a transform matrix where a result of multiplication with the channel matrix is a block diagonal orthogonal matrix, based on the channel matrix;
    a fourth step of obtaining standardization factors for each user terminal by obtaining a square of elements that are diagonals of the block diagonal orthogonal matrix;
    a fifth step of carrying out standardizing processing on symbols of each user to be transmitted using the standardization factors to obtain standardized symbols;
    a sixth step of multiplying the standardized symbols with a conjugate transposed matrix of the block diagonal orthogonal matrix from the left and then multiplying the multiplication result with the transform matrix from the left and obtaining processed symbols; and a seventh step of transmitting the processed symbols based on space time block coding rules.

2. The downlink multi-user space time block code pre-coding method according to claim 1, wherein, in the first step, the base station acquires channel information based on feedback information of each user terminal in the case of FDD, and directly acquires channel information using channel symmetry in a case of TDD.

3. The downlink multi-user space time block code pre-coding method according to claim 1, wherein, in the second step, the channel information for each user terminal is transformed to a channel matrix utilizing space time code characteristics.

4. The downlink multi-user space time block code pre-coding method according to claim 1, wherein, in the fifth step, symbols of each user to be transmitted are divided by corresponding standardization factors.

5. The downlink multi-user space time block code pre-coding method according to claim 1, wherein the base station uses two antennas for all users.

6. The downlink multi-user space time block code pre-coding method according to claim 1, wherein, for the base station provided with four antennas and two user terminals, a first antenna and a second antenna are used for a first user and a third antenna and a fourth antenna are used for a second user, processed symbol z is $z=(z_1, z_2, z_3, z_4)^T$, and, in a first symbol period, $z_1$ and $z_2$ are transmitted by the first and second antennas, and $z_3$ and $z_4$ are transmitted by the third and fourth antennas, and, in a second symbol period, $-z^*_2$ and $z^*_1$ are transmitted by the first and second antennas, and $-z^*_4$ and $z^*_3$—are transmitted by the third and fourth antennas.

7. A method for demodulating symbols encoded using the downlink multi-user space time block code pre-coding method according to claim 6, comprising the steps of:

directly demodulating data received in the first symbol period; and demodulating data received in the second symbol period after obtaining conjugates.

* * * * *